(12) United States Patent
Baba et al.

(10) Patent No.: US 7,090,941 B2
(45) Date of Patent: Aug. 15, 2006

(54) FUEL CELL STACK AND A METHOD OF SUPPLYING REACTANT GASES TO THE FUEL CELL STACK

(75) Inventors: Ichiro Baba, Utsunomiya (JP); Yosuke Fujii, Kawachi-gun (JP); Ken Takahashi, Utsunomiya (JP); Daisuke Wachi, Shioya-gun (JP); Hiromichi Yoshida, Shiyoa-gun (JP); Takaki Nakagawa, Utsunomiya (JP); Yoshinori Wariishi, Utsunomiya (JP); Masaharu Suzuki, Utsunomiya (JP); Seiji Sugiura, Utsunomiya (JP); Narutoshi Sugita, Utsunomiya (JP); Hideaki Kikuchi, Kawachi-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 297 days.

(21) Appl. No.: 10/243,467

(22) Filed: Sep. 13, 2002

(65) Prior Publication Data
US 2003/0054223 A1    Mar. 20, 2003

(30) Foreign Application Priority Data
Sep. 14, 2001    (JP) .............................. 2001-280317

(51) Int. Cl.
    *H01M 8/02* (2006.01)
(52) U.S. Cl. .......................................... 429/34; 429/38
(58) Field of Classification Search ................ 429/30, 429/34, 38
    See application file for complete search history.

(56) References Cited

U.S. PATENT DOCUMENTS

| 5,478,662 A | * | 12/1995 | Strasser ....................... 429/13 |
| 5,776,625 A | | 7/1998 | Kaufman et al. |
| 5,935,726 A | | 8/1999 | Chow et al. |
| 6,015,634 A | | 1/2000 | Bonville, Jr. et al. |
| 6,251,534 B1 | * | 6/2001 | McElroy ....................... 429/13 |
| 6,294,278 B1 | * | 9/2001 | Wohr et al. ................... 429/24 |
| 6,534,209 B1 | * | 3/2003 | Hauer ........................... 429/13 |
| 6,821,668 B1 | * | 11/2004 | Perry et al. ................... 429/38 |
| 2001/0002299 A1 | * | 5/2001 | Reiser .......................... 429/13 |

FOREIGN PATENT DOCUMENTS

| EP | 0596366 B1 | | 4/1997 |
| JP | 07320755 | | 12/1995 |
| JP | 10284095 A | * | 10/1998 |
| JP | 11-312531 A | | 11/1999 |
| JP | 2000090947 A | * | 3/2000 |
| WO | WO-02/071525 A2 | | 9/2002 |

OTHER PUBLICATIONS

Fuel Cell Handbook—5th ed By EG&G Services, U.S. Department of Energy, Oct. 2000, pp. 1-25, 1-26 and 3-1 through 3-16.*
European Search Report for Application No. 02020650.4-2119, dated Jan. 20, 2006.

* cited by examiner

*Primary Examiner*—Gregg Cantelmo
(74) *Attorney, Agent, or Firm*—Lahive & Cockfield, LLP; Anthony A. Laurentano, Esq.

(57) ABSTRACT

A cell assembly is formed by stacking a first cell and a second cell. In the cell assembly, oxygen-containing gas flow passages are connected in series by an intermediate oxygen-containing gas flow passage, and fuel gas flow passages are connected in series by an intermediate fuel gas flow passage. An additional oxygen-containing gas is supplied to an oxygen-containing gas passage which includes the intermediate oxygen-containing gas flow passage. An additional fuel gas is supplied to a fuel gas passage which includes the intermediate fuel gas flow passage.

4 Claims, 11 Drawing Sheets

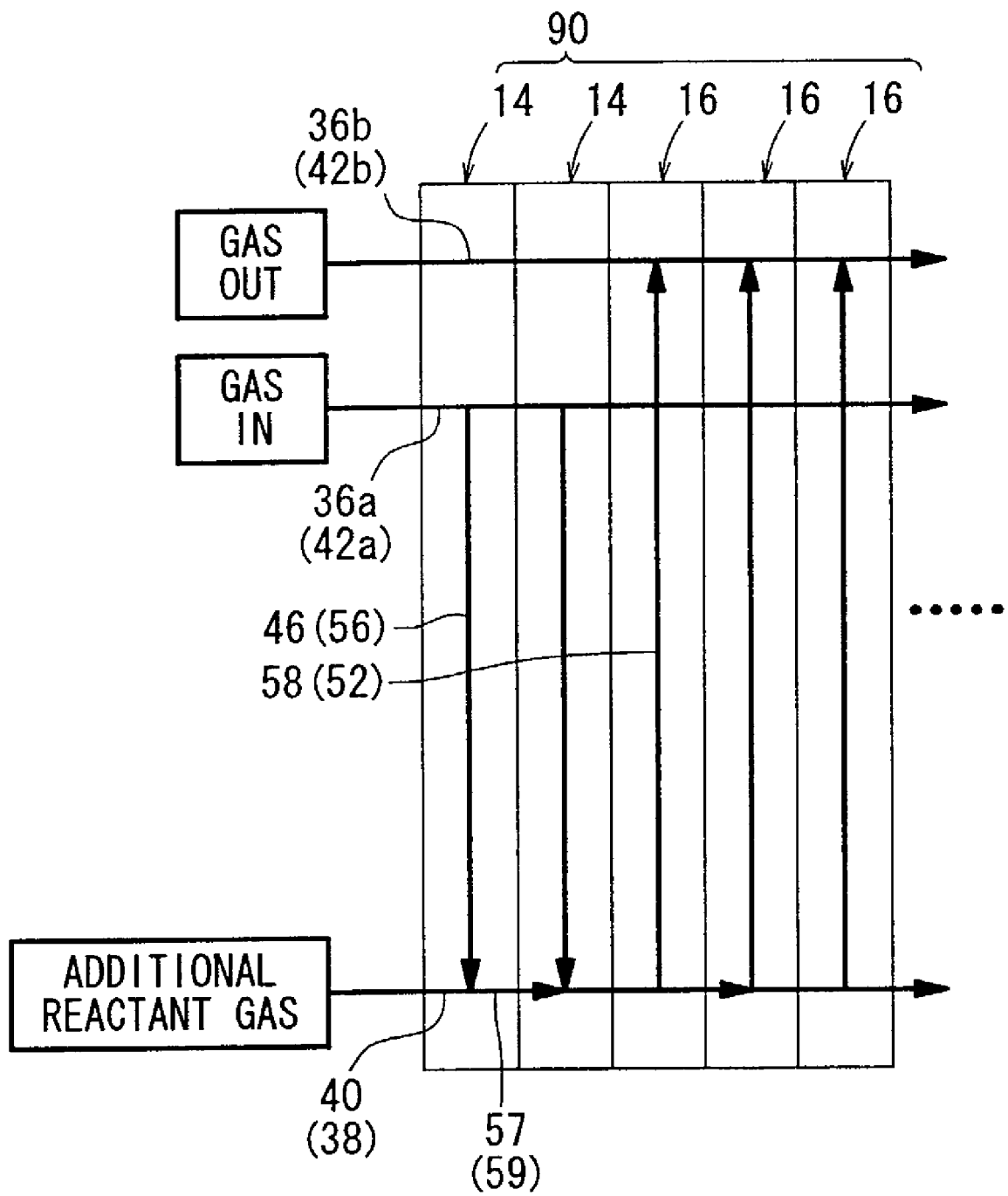

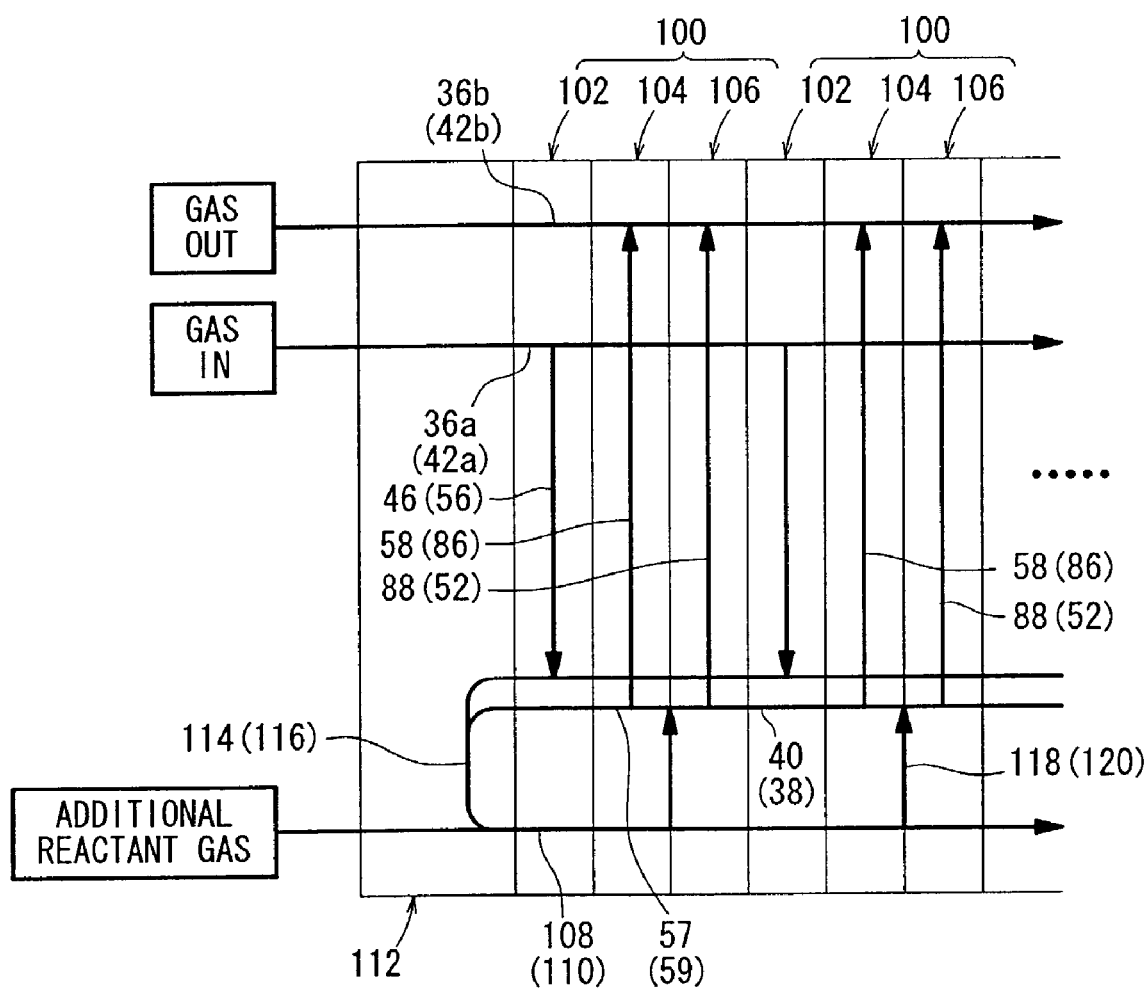

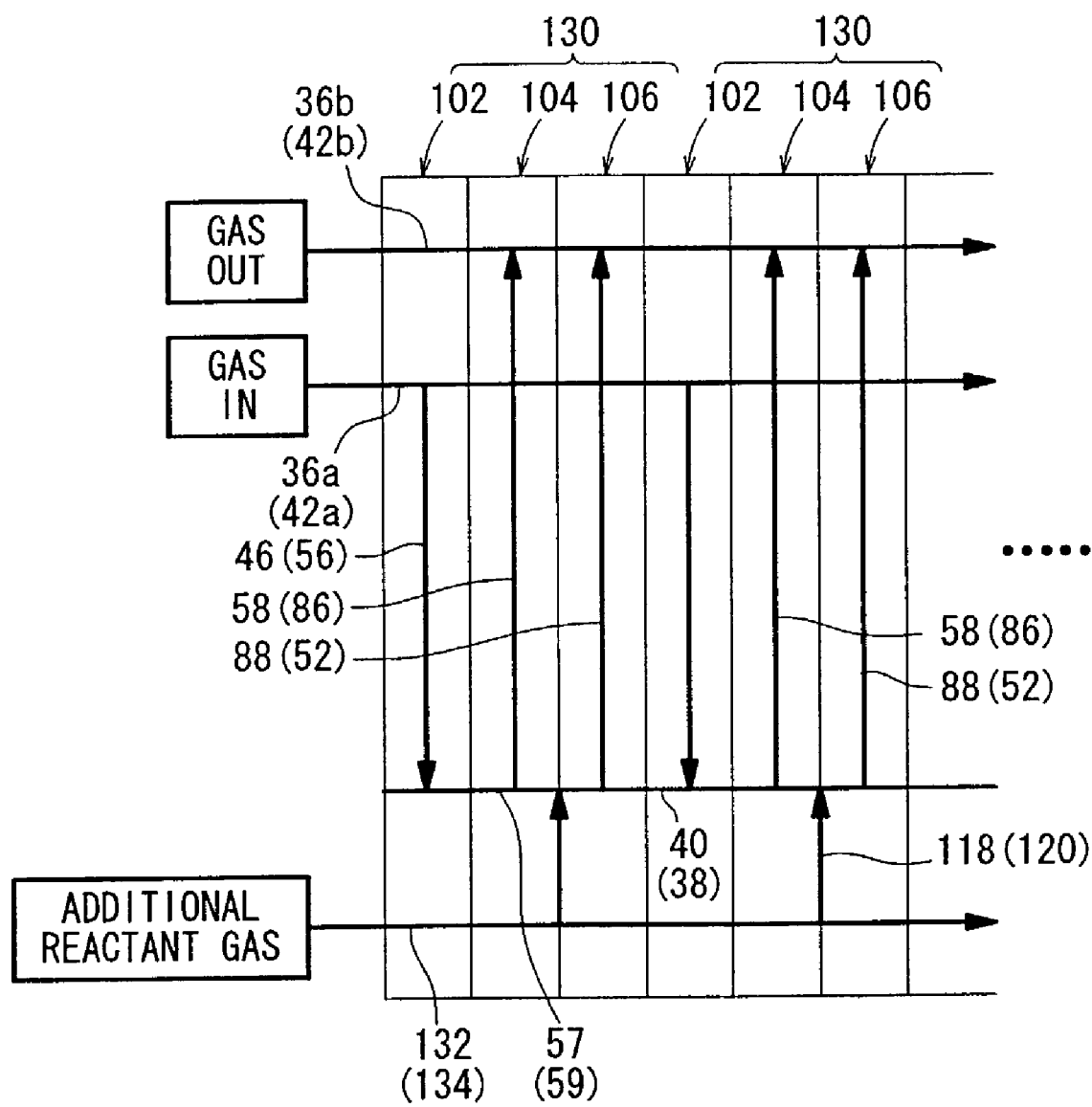

FUEL CELL STACK AND A METHOD OF SUPPLYING REACTANT GASES TO THE FUEL CELL STACK

BACKGROUND OF THE INVENTION

1. Field of the Invention

The present invention relates to a fuel cell stack including a cell assembly of unit cells stacked together, and a method of supplying reactant gases to the fuel cell stack. Each of the unit cells has a membrane electrode assembly including an anode, a cathode, and an ion exchange membrane of solid polymer electrolyte interposed between the anode and the cathode.

2. Description of the Related Art

Generally, a solid polymer electrolyte fuel cell employs a membrane electrode assembly (MEA) which comprises two electrodes (anode and cathode) and an electrolyte membrane interposed between the electrodes. The electrolyte membrane is a polymer ion exchange membrane (proton exchange membrane). Each of the electrodes comprises a catalyst and a porous carbon sheet. The membrane electrode assembly is interposed between separators (bipolar plates). The membrane electrode assembly and the separators make up a unit of the fuel cell (unit cell) for generating electricity. A plurality of unit cells are connected together to form a fuel cell stack.

In the fuel cell, a fuel gas such as a hydrogen-containing gas is supplied to the anode. The catalyst of the anode induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current. An oxygen-containing gas or air is supplied to the cathode. At the cathode, the hydrogen ions from the anode combine with the electrons and oxygen to produce water.

In the fuel cell, if the ion exchange membrane is dried, it is not possible to keep the operation of high output density. Therefore, it is desirable to moisten the ion exchange membrane suitably. Further, the water produced in the electrochemical reaction should be discharged from the fuel cell stack, particularly from the cathode in order to prevent the voltage drop of unit cell due to the condensation of water vapor, for example.

In an attempt to provide a solution for the problems, for example, Japanese laid-open patent publication No. 11-312531 (prior art) discloses a fuel cell device which includes cell stacks connected in series. The cell stack includes a plurality of unit cells stacked together. Each of the unit cells includes separators and a membrane electrode assembly interposed between the separators. The membrane electrode assembly includes an anode, a cathode, and an ion exchange membrane of solid polymer electrolyte interposed between the anode and the cathode. Reactant gases flow through the cell stacks operated at low, middle, and high temperatures. The temperature of cell stacks increases in the flow direction of the reactant gases. The reactant gases are humidified according to the operating temperature of the cell stack flowing at first, and supplied to the cell stacks.

In the prior art, the fuel cell stacks are operated at the low, middle, and high temperatures, such that the temperature of the fuel cell stack increases in the flow direction of reactant gases. Therefore, even if water vapor is condensed in the fuel cell stack operated at the low temperature, the condensed water is vaporized in the fuel cell stack operated at the middle or high temperature. Therefore, reaction of the oxygen-containing gas is carried out suitably.

In the prior art, the fuel cell stacks need to be controlled at different temperatures, for example, at 50°, 60°, 65°. Therefore, the temperature control is difficult, and a complicated device is needed for the temperature control.

SUMMARY OF THE INVENTION

A general object of the present invention is to provide a fuel cell stack in which the power generation performance in each of unit cells is improved effectively, the amount of water needed for humidification is small, and the pressure drops are small.

A principle object of the present invention is to provide a method of supplying reactant gases to a fuel cell stack in which power generation is effectively carried out in each of unit cells, and water is discharged form the fuel cell stack efficiently.

According to the present invention, a reactant gas including at least one of a fuel gas and an oxygen-containing gas is supplied to the unit cells through reactant gas flow passages. The reactant gas flow passages are connected in series by a reactant gas passage to which an additional reactant gas is supplied.

The reactant gas is supplied to an upstream unit cell (unit cell on the upstream side) for inducing a chemical reaction in the upstream unit cell. The reactant gas supplied to the reactant gas after the chemical reaction in the upstream unit cell and an additional reactant gas supplied to the reactant passage are mixed, and the mixed gas is supplied to a downstream unit cell (unit cell on the downstream side) for inducing a chemical reaction in the downstream unit cell.

Water produced in the upstream unit cell is used to humidify the additional reactant gas supplied through the reactant gas passage for supplying the humidified gas to the downstream unit cell. Therefore, the amount of water needed for humidifying the reactant gas to the overall fuel cell stack is very small, and the humidifying device is small. Further, the pressure drops are small. Since the humidity of the reactant gas passage is reduced by the additional reactant gas, it is possible to prevent the condensation of water vapor in the reactant gas passage.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 9 is a view showing flows of fluid in cell assemblies of another example;

FIG. 10 is a view showing flows of fluid in cell assemblies of a fuel cell stack according to a third embodiment of the present invention; and FIG. 11 is a view showing flows of fluid in cell assemblies of a fuel cell stack according to a fourth embodiment.

DESCRIPTION OF THE PREFERRED EMBODIMENTS

Figure 1:
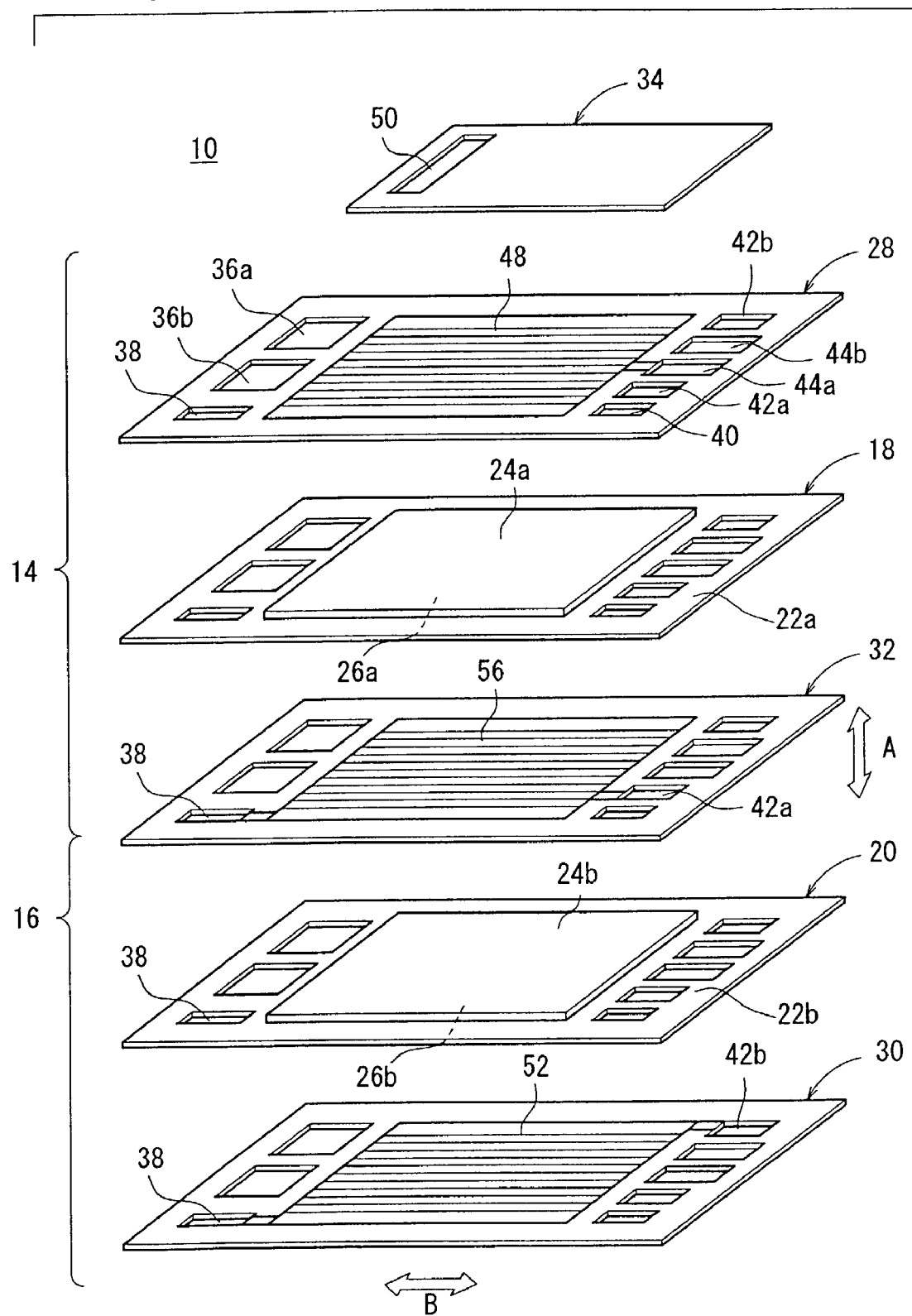
FIG. 1 is an exploded perspective view showing main components of a cell assembly as a part of a fuel cell stack according to a first embodiment of the present invention.
Figure 2:
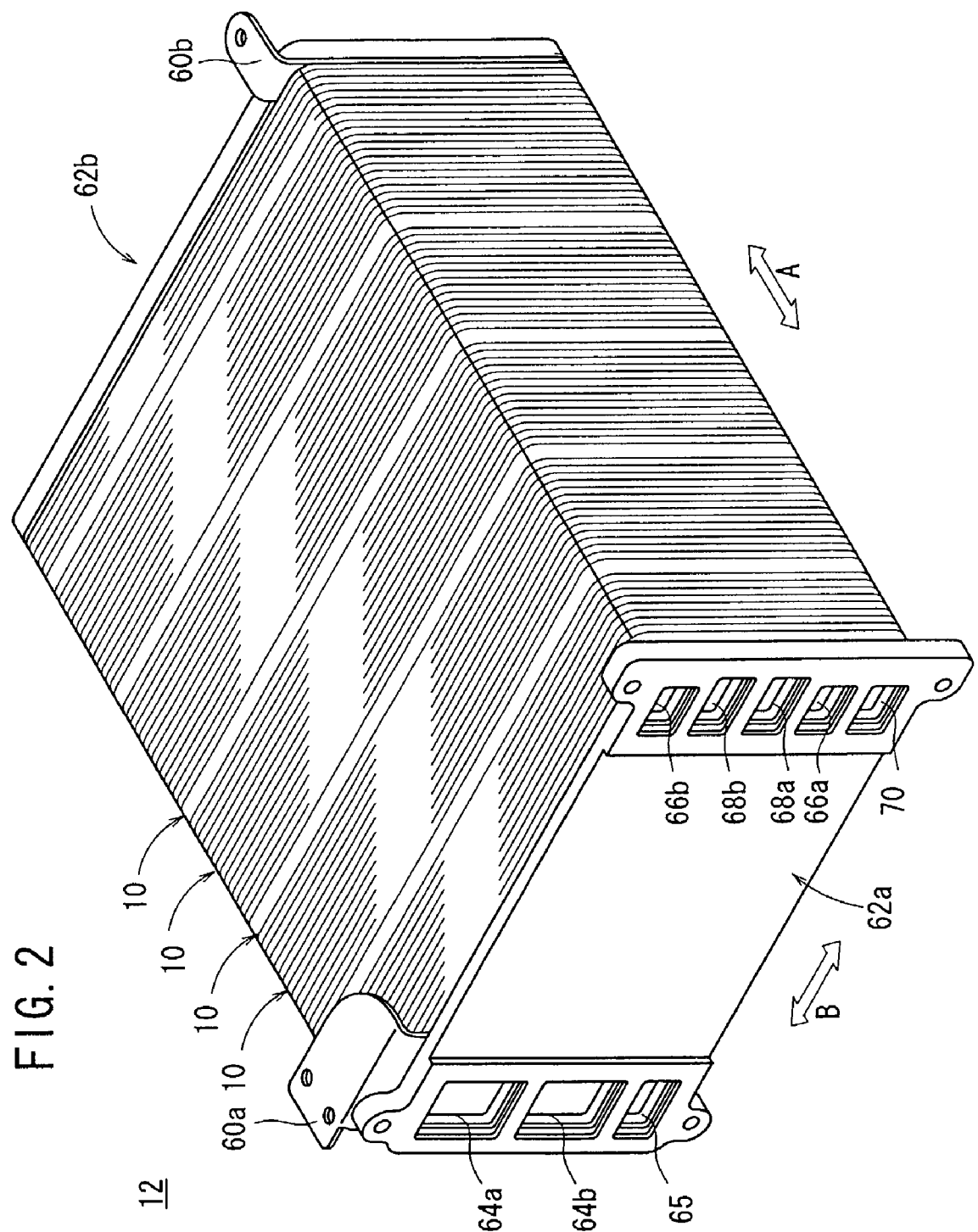
FIG. 2 is a schematic perspective view showing the fuel cell stack.

FIG. 1 is a schematic exploded view showing main components of a solid polymer cell assembly 10 of a fuel cell stack 12 according to a first embodiment of the present invention. FIG. 2 is a schematic perspective view of the fuel cell stack 12 formed by stacking a plurality of the cell assemblies 10.

As shown in FIG. 1, a first unit of a fuel cell (first unit cell) 14 and a second unit of a fuel cell (second unit cell) 16 are stacked together to form the cell assembly 10. The first unit cell 14 includes a first membrane electrode assembly 18, and the second unit cell 16 includes a second membrane electrode assembly 20.

The first membrane electrode assembly 18 includes a cathode 24a, an anode 26a, and a solid polymer ion exchange membrane 22a interposed between the cathode 24a, and the anode 26a, and the second membrane electrode assembly 20 includes a cathode 24b, an anode 26b, and a solid polymer ion exchange membrane 22b interposed between the cathode 24b, and the anode 26b. Each of the cathodes, 24a, 24b, and the anodes 26a, 26b is an electrode comprising a porous carbon sheet having a catalyst layer.

Figure 3:
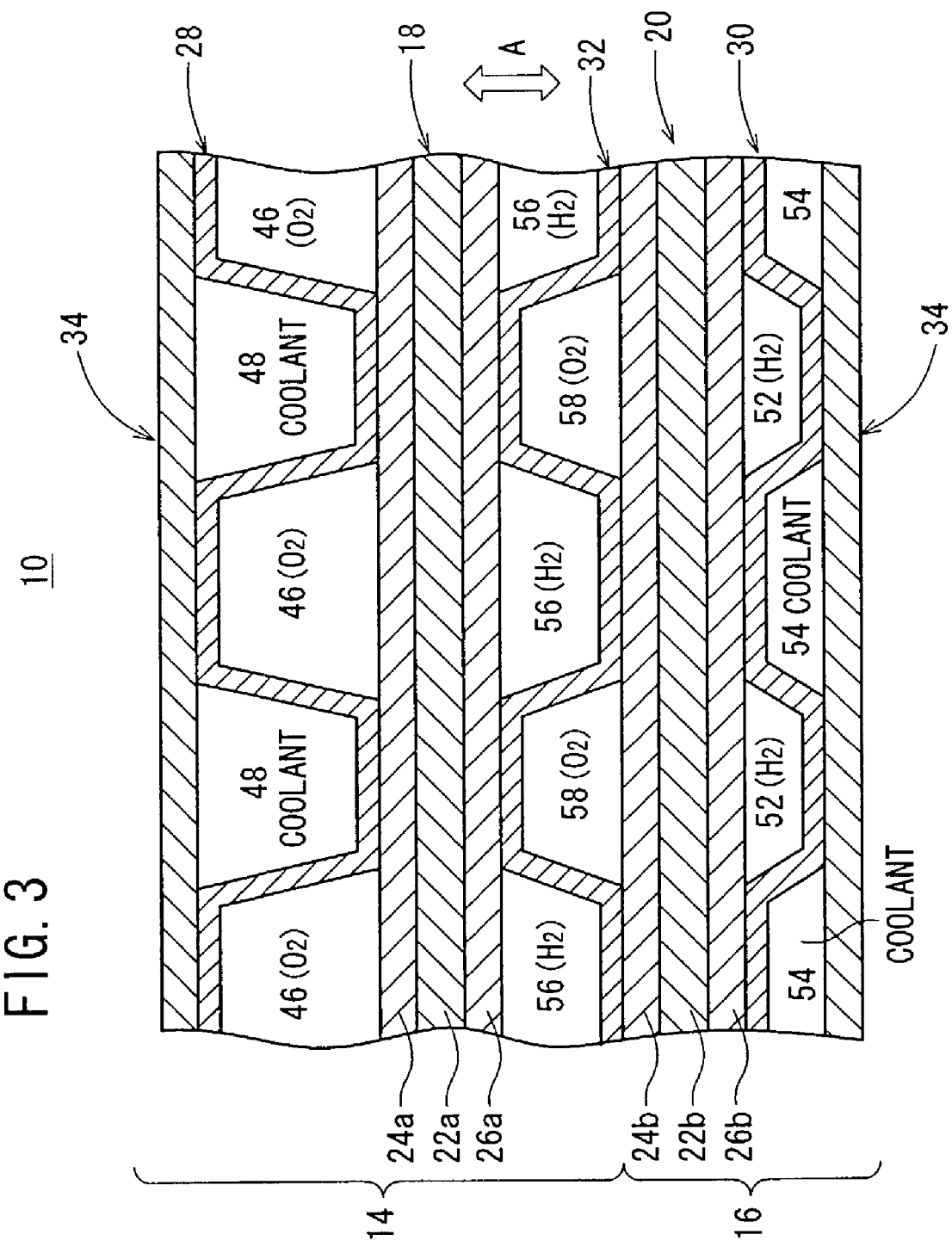
FIG. 3 is a partial cross sectional view showing the cell assembly.

As shown in FIGS. 1 and 3, a first separator 28 is stacked on cathode 24a of the first membrane electrode assembly 18, and a second separator 30 is stacked on the anode 26b of second membrane electrode assembly 20. An intermediate separator 32 is interposed between the first membrane electrode assembly 18 and the second membrane electrode assembly 20. Thin wall plates (partition walls) 34 are attached to opposite outer surfaces of the first separator 28 and the second separator 30. Each of the first separator 28, the second separator 30, and the intermediate separator 32 is made of a dense carbon, for example.

As shown in FIG. 1, each of the first membrane electrode assembly 18, the second membrane electrode assembly 20, the first separator 28, second separator 30, and the intermediate separator 32 has three holes at one longitudinal end in a direction indicated by an arrow B. When the first membrane electrode assembly 18, the second membrane electrode assembly 20, the first separator 28, second separator 30, and the intermediate separator 32 are stacked in a direction indicated by an arrow A, these holes form an oxygen-containing gas supply passage 36a, an oxygen-containing gas discharge passage 36b, and a fuel gas passage 38. The oxygen-containing gas supply passage 36a and the oxygen-containing gas discharge passage 36b are passages for an oxygen-containing gas (reactant gas) such as air. The fuel gas passage 38 is a passage for a fuel gas (reactant gas) such as a hydrogen-containing gas. The reactant gases flow in a direction from the first unit cell 14 on the upstream side to the second unit cell 16 on the downstream side. The fuel gas is supplied to the first unit cell 14 for inducing a chemical reaction in the first unit cell 14. After the chemical reaction, the fuel gas is discharged from the first unit cell 14. The fuel gas discharged from the first unit cell 14 and an additional fuel gas supplied from an external gas source flow through the fuel gas passage 38, and are supplied to the second unit cell 16.

Further, each of the first membrane electrode assembly 18, the second membrane electrode assembly 20, the first separator 28, second separator 30, and the intermediate separator 32 has five holes at the other longitudinal end in the direction indicated by the arrow B. When the first membrane electrode assembly 18, the second membrane electrode assembly 20, the first separator 28, second separator 30, and the intermediate separator 32 are stacked in the direction indicated by the arrow A, these holes form an oxygen-containing gas passage 40 as a passage for the oxygen-containing gas, a fuel gas supply passage 42a, a fuel gas discharge passage 42b as passages for the fuel gas, a coolant supply passage 44a, and a coolant discharge passage 44b as passages for a coolant. The oxygen-containing gas is supplied to the first unit cell 14 for inducing a chemical reaction in the first unit cell 14. After the chemical reaction, the oxygen-containing gas is discharged from the first unit cell 14. The oxygen-containing gas discharged from the first unit cell 14 and an additional oxygen-containing gas supplied from an external gas source flow through the oxygen-containing gas passage 40, and are supplied to the second unit cell 16.

Figure 4:
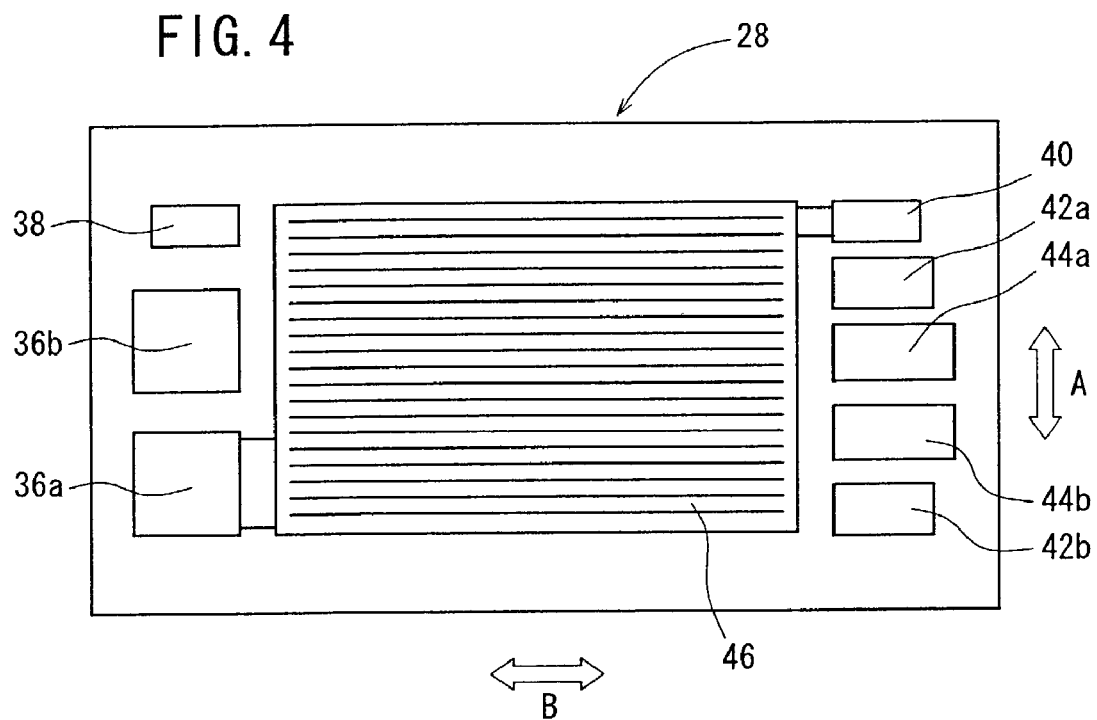
FIG. 4 is a front view showing a first separator of the cell assembly.

The first separator 28 is a thin metal plate having a rough surface (e.g., corrugated surface) corresponding to a reaction surface (power generating surface) of the first membrane electrode assembly 18. As shown in FIGS. 3 and 4, the first separator 28 has an oxygen-containing gas flow passage (reactant gas flow passage) 46 comprising a plurality of grooves on its surface facing to the cathode 24a of the first membrane electrode assembly 18. The oxygen-containing gas flow passage 46 extends in a longitudinal direction of the first separator 28 indicated by the arrow B. The oxygen-containing gas flow passage 46 is connected to the oxygen-containing gas supply passage 36a at one end, and connected to the oxygen-containing gas passage 40 at the other end.

As shown in FIGS. 1, and 3, the first separator 28 has a coolant flow passage 48 comprising a plurality of grooves on its surface facing to a surface of the wall plate 34. The coolant flow passage 48 extends in the longitudinal direction indicated by the arrow B. The coolant flow passage 48 is connected to the coolant supply passage 44a at one end, and connected to a hole 50 of the wall plate 34 at the other end. The hole 50 is a turning point of the coolant flow, and connected to the coolant discharge passage 44b through a passage on the other surface of the wall plate 34. The hole 50 may be formed on another member (not shown) instead of the wall plate 34.

The structure of the second separator 30 is substantially the same as the structure of the first separator 28. The second separator 30 has a fuel gas flow passage (reactant gas flow passage) 52 comprising a plurality of grooves on its surface facing to the anode 26b of the second membrane electrode assembly 20. The fuel gas flow passage 52 extends in the longitudinal direction indicated by the arrow B. The fuel gas flow passage 52 is connected to the fuel gas passage 38 at one end, and connected to the fuel gas discharge passage 42b at the other end. Further, the second separator 30 has a coolant flow passage 54 comprising a plurality of grooves on its surface facing to the wall plate 34 (see FIG. 3). The coolant flow passage 54 extends in the longitudinal direction indicated by the arrow B. The coolant flow passage 54 is connected to the coolant discharge passage 44b at one end.

The structure of the intermediate separator 32 is substantially the same as the structure of the first separator 28 and the structure of the second separator 30. The intermediate separator 32 has a fuel gas flow passage 56 (reactant gas flow passage) comprising a plurality of grooves on its surface facing to the anode 26a of the first membrane electrode assembly 18. The fuel gas flow passage 56 extends in the longitudinal direction indicated by the arrow B. The fuel gas flow passage 56 is connected to the fuel gas supply passage 42a at one end, and connected to the fuel gas passage 38 at the other end.

As shown in FIG. 3, the intermediate separator 32 has an oxygen-containing gas flow passage 58 (reactant gas flow passage) comprising a plurality of grooves on its surface facing to the cathode 24b of the second membrane electrode assembly 20. The oxygen-containing gas flow passage 58 extends in the longitudinal direction indicated by the arrow B. The oxygen-containing gas flow passage 58 is connected to the oxygen-containing gas passage 40 at one end, and connected to the oxygen-containing gas discharge passage 36b at the other end.

In the first embodiment, the oxygen-containing gas flow passage 46 of the first unit cell 14 and the oxygen-containing gas flow passage 58 of the second unit cell 16 are connected in series, and the fuel gas flow passage 56 of the first unit cell 14 and the fuel gas flow passage 52 of the second unit cell 16 are connected in series. Cross sectional areas of the oxygen-containing gas flow passages 46, 58 are different, and cross sectional areas of the fuel gas flow passages 56, 52 are different. Specifically, as shown in FIG. 3, the cross sectional area of the oxygen-containing gas flow passage 58 on the downstream side is smaller than the cross sectional area of the oxygen-containing gas flow passage 46 on the upstream side. Similarly, the cross sectional area of the fuel gas flow passage 52 on the downstream side is smaller than the cross sectional area of the fuel gas flow passage 56 on the upstream side. Alternatively, the cross sectional areas of the oxygen-containing gas passages or the fuel gas flow passages may be the same.

Figure 5:
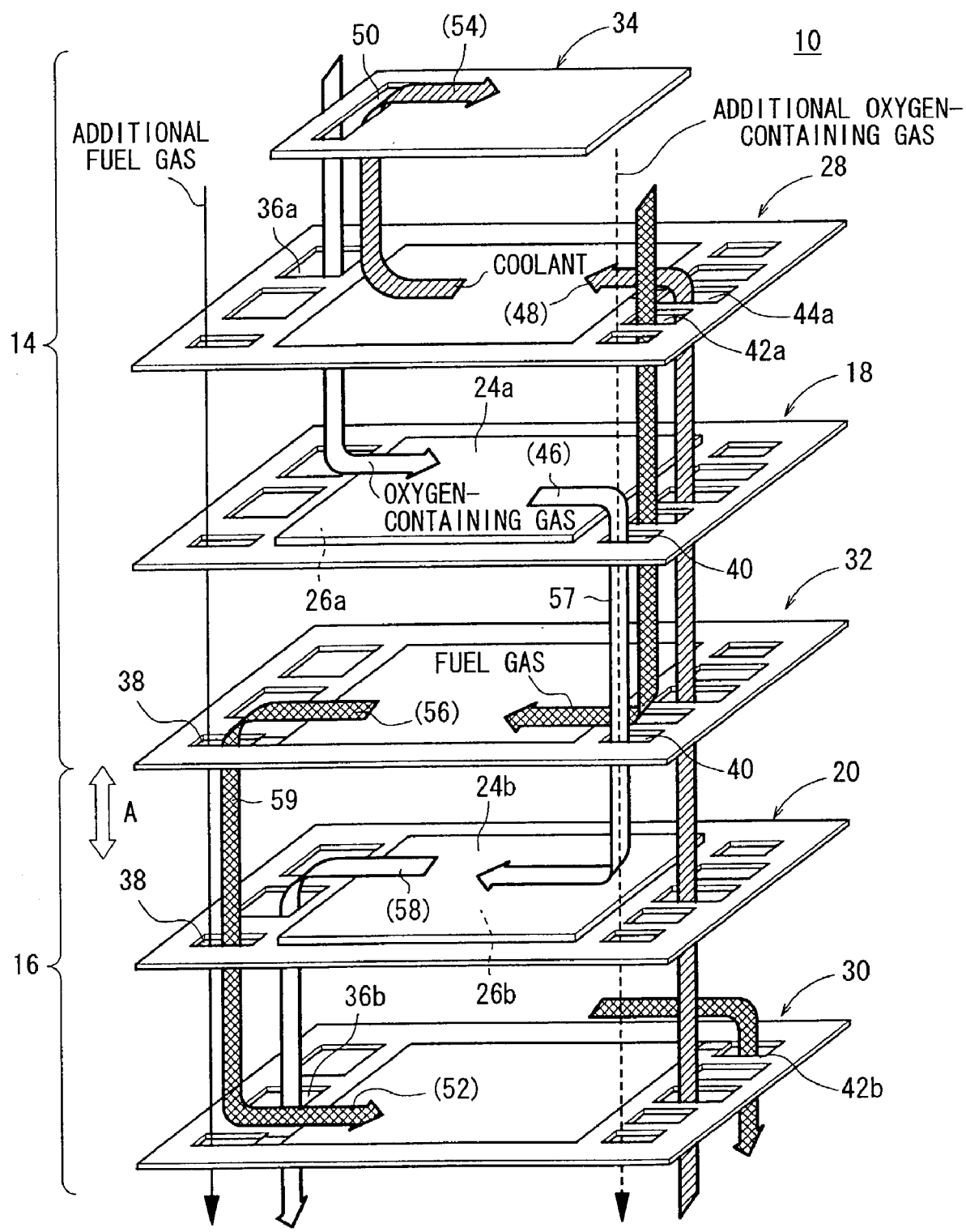
FIG. 5 is an exploded perspective view showing flows of fluid in the cell assembly.

As shown in FIG. 5, the oxygen-containing gas flow passage 46 of the first unit cell 14 and the oxygen-containing gas flow passage 58 of the second unit cell 16 are connected in series by the oxygen-gas passage 40, i.e., an intermediate oxygen-containing gas flow passage 57 connecting the first membrane electrode assembly 18 and intermediate separator 32.

The fuel gas flow passage 56 of the first unit cell 14 and the fuel gas flow passage 52 of the second unit cell 16 are connected in series by the fuel gas passage 38, i.e., an intermediate fuel gas flow passage 59 connecting the second separator 32 and the second membrane electrode assembly 20.

As shown in FIG. 2, a predetermined number of the cell assemblies 10 are fixed together using fixing means (not shown), i.e., stacked together in the direction indicated by the arrow A. Collecting electrodes 60a, 60b are stacked on outside of outermost cell assemblies 10, respectively. Further, end plates 62a, 62b are stacked on the outside of the current collectors 60a, 60b, respectively. The cell assemblies 10 and the current collectors 60a, 60b are fastened together to form the fuel cell stack 12 by tightening the end plates 62a, 62b with an unillustrated tie rod or the like.

At one longitudinal end of the end plate 62a, an oxygen-containing gas supply port 64a, an oxygen-containing gas discharge port 64b, and an intermediate fuel gas supply port 65 are arranged. The oxygen-containing gas supply port 64a is connected to the oxygen-containing gas supply passage 36a, the oxygen-containing gas discharge port 64b is connected to the oxygen-containing gas discharge passage 36b, and an intermediate fuel gas discharge port 65 is connected to the fuel gas passage 38. At the other longitudinal end of the end plate 62a, a fuel gas supply port 66a, a fuel gas discharge port 66b, a coolant supply port 68a, a coolant discharge port 68b, and an intermediate oxygen-containing gas supply port 70 are arranged. The fuel gas supply port 66a is connected to the fuel gas supply passage 42a, the fuel gas discharge port 66b is connected to the fuel gas discharge passage 42b, the coolant supply port 68a is connected to the coolant supply passage 44a, the coolant discharge port 68b is connected to the coolant discharge passage 44b, and the intermediate oxygen-containing gas supply port 70 is connected to the oxygen-containing gas passage 40.

Next, an operation of the fuel cell stack 12 will be described below.

In the fuel cell stack 12, a fuel gas such as a hydrogen-containing gas is supplied to the fuel gas supply port 66a, an oxygen-containing gas such as air is supplied to the oxygen-containing gas supply port 64a, a coolant such as a pure water, an ethylene glycol or an oil is supplied to the coolant supply port 68a. From the fuel gas supply port 66a, the oxygen-containing gas supply port 64a, and the coolant supply port 68a, the fuel gas, the oxygen-containing gas, and the coolant are supplied to each of the cell assemblies 10 stacked together in the direction indicated by the arrow A to form the fuel cell stack 12.

As shown in FIG. 5, the oxygen-containing gas flows through the oxygen-containing gas supply passage 36a, and flows into the grooves of the oxygen-containing gas flow passage 46 formed on the first separator 28. The oxygen-containing gas in the oxygen-containing gas flow passage 46 flows along the cathode 24a of the first membrane electrode assembly 18 to induce a chemical reaction at the cathode 24a. The fuel gas flows through the fuel gas supply passage 42a, and flows into the grooves of the fuel gas flow passage 56 formed on the intermediate separator 32. The fuel gas in the fuel gas flow passage 56 flows along the anode 26a of the first membrane electrode assembly 18 to induce a chemical reaction at the anode 26a. In the first membrane electrode assembly 18, the oxygen-containing gas supplied to the cathode 24a, and the fuel gas supplied to the anode 26a are consumed in the electrochemical reactions at catalyst layers of the cathode 24a and the anode 26a for generating electricity.

Oxygen in the oxygen-containing gas is partially consumed in the chemical reaction in the first membrane electrode assembly 18. The oxygen-containing gas flows out of the oxygen-containing gas flow passage 46, flows through the intermediate oxygen-containing gas flow passage 57 (oxygen-containing gas passage 40) in the direction indicated by the arrow A, and flows into the oxygen-containing gas flow passage 58 formed on the intermediate separator 32. The oxygen-containing gas in the oxygen-containing gas flow passage 58 flows along the cathode 24b of the second membrane electrode assembly 20 to induce a chemical reaction at the cathode 24b.

Similarly, hydrogen in the fuel gas is partially consumed in the chemical reaction at the anode 26a of the first membrane electrode assembly 18. The fuel gas flows through the intermediate fuel gas flow passage 59 (fuel gas passage 38) in the direction indicated by the arrow A, and flows into the fuel gas flow passage 52 formed on the second separator 30. The fuel gas in the fuel gas flow passage 52 flows along the anode 26b of the second membrane electrode assembly 20 to induce a chemical reaction at the anode 26b. In the second membrane electrode assembly 20, the oxygen-containing gas and the fuel gas are consumed in the electrochemical reactions at catalyst layers of the cathode 24b and the anode 26b for generating electricity. After oxygen is consumed, the oxygen-containing gas flows out of the oxygen-containing gas flow passage 58, and flows into the oxygen-containing gas discharge passage 36b. After hydrogen is consumed, the fuel gas flows out of the fuel gas flow passage 52, and flows into the fuel gas discharge passage 42b.

The coolant flows through the coolant supply passage 44a, and flows into the coolant flow passage 48. The coolant in the flow passage 48 turns back at the hole 50 of the wall-plate 34, flows through the coolant flow passage 54 formed on the second separator 30, and flows into the coolant discharge passage 44b.

When oxygen-containing gas flows along the cathode 24a of the first unit cell 14, water (vapor) is produced in the electrochemical reaction at the cathode 24a. The water flows into the intermediate oxygen-containing gas flow passage 57.

Figure 6:
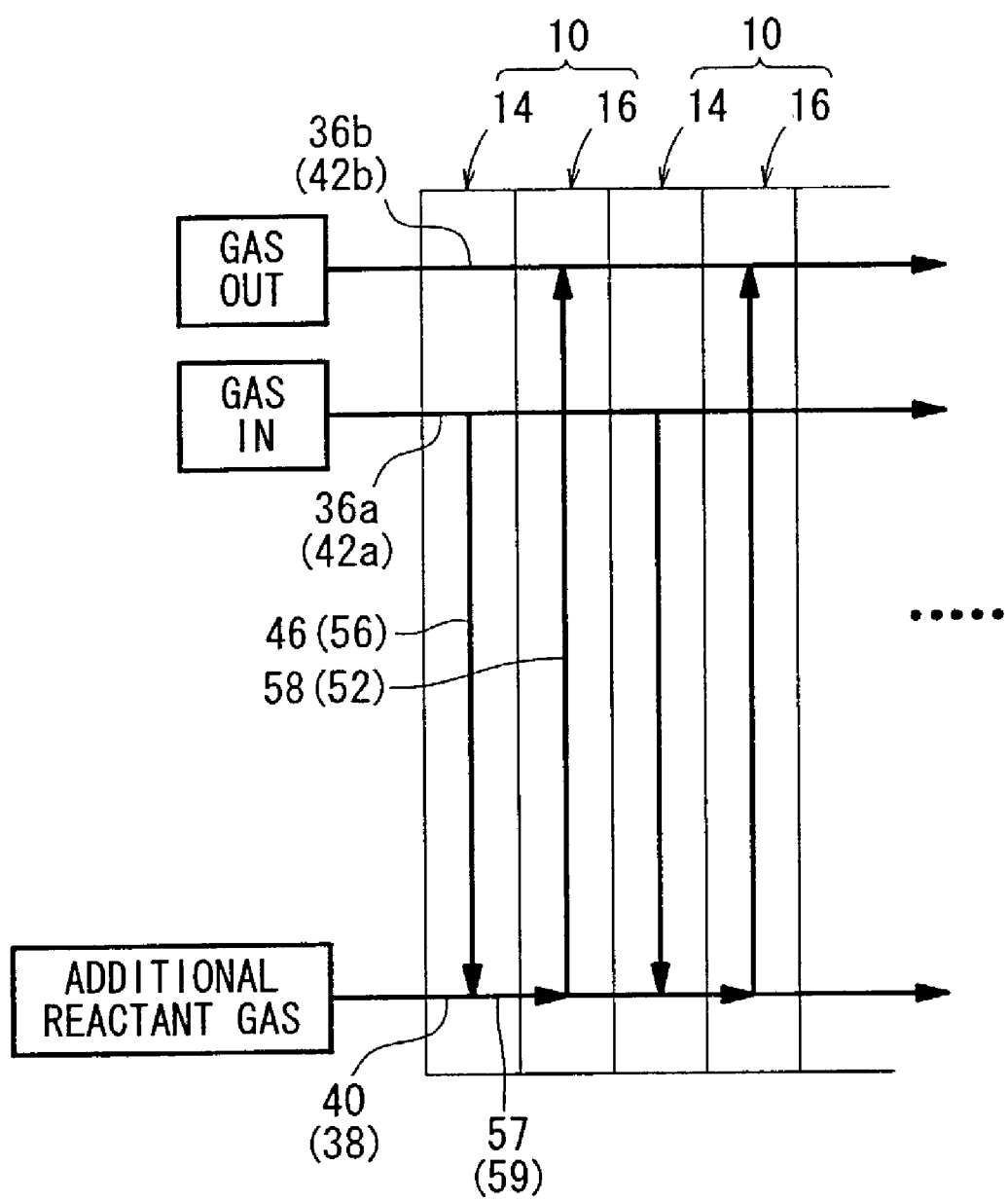
FIG. 6 is a view showing the fluid flows in cell assemblies.

As shown in FIGS. 5, and 6, an additional oxygen-containing gas having a relatively low humidity is supplied to the oxygen-containing gas passage 40 which includes the intermediate oxygen-containing gas flow passage 57. The additional oxygen-containing gas is supplied directly (without passing through the first unit cell 14) to the intermediate oxygen-containing gas flow passage 57 from the intermediate oxygen-gas supply port 70. Therefore, the additional oxygen-containing gas supplied to the intermediate oxygen-containing gas flow passage 57 is a "fresh oxygen-containing gas" whose oxygen is not consumed in the first unit cell 14. The additional oxygen-containing gas is humidified by the vapor in the intermediate oxygen-containing gas flow passage 57, and joins the oxygen-containing gas whose oxygen is partially consumed in the chemical reaction in the first unit cell 14. Thus, the oxygen-containing gas from the first unit cell 14 and the additional oxygen-containing gas are jointly supplied to the oxygen-containing gas flow passage 58 of the second unit cell 16.

As described above, the additional oxygen-containing gas having the low humidity is suitably humidified in the intermediate oxygen-containing gas flow passage 57 using water produced in the chemical reaction. Therefore, the amount of water needed for humidifying the oxygen-containing gas supplied to the fuel cell stack 12 is small. Therefore, the size of a humidifying device for the fuel cell stack 12 can be reduced. Further, since the additional oxygen-containing gas is directly supplied to the oxygen-containing gas passage 40, the pressure drops in the oxygen-containing gas flow passages 46, 58 are small.

Further, since the water produced in the chemical reaction is used for humidifying the additional oxygen-containing gas, it is possible to reduce the humidity in the intermediate oxygen-containing gas flow passage 57. In the cell assembly 10, the oxygen-containing gas having a suitable humidity is supplied to each of the first unit cell 14 and the second unit cell 16. Therefore, the power generation in the overall cell assembly 10 is efficiently carried out.

The fuel gas is humidified in advance before it is supplied to the cell assembly 10. The amount of water (vapor) in the fuel gas does not change significantly when the fuel gas is consumed in the first unit cell 14 and the second unit cell 16. The fuel gas flows along the anode 26a of the first unit cell 14. Thus, the fuel gas is partially consumed, and supplied to the anode 26b of the second unit cell 16. Therefore, the amount of the fuel gas is reduced, and thus, the vapor concentration, i.e., the humidity of the fuel gas is increased.

In the first embodiment, an additional fuel gas having a low humidity is supplied to the intermediate fuel gas flow passage 59 so that the fuel gas having a predetermined humidity is supplied to each of the first unit cell 14 and the second unit cell 16. The humidity of the fuel gas is kept at a desired level.

As described above, in the first embodiment, the humidity of the oxygen-containing gas supplied to the oxygen-containing gas flow passage 46 of the first unit cell 14 and the oxygen-containing gas supplied the oxygen-containing gas flow passage 58 of the second unit cell 16 is kept at a desired level. Further, the humidity of the fuel gas supplied to the fuel gas flow passage 56 of the first unit cell 14 and the fuel gas flow passage 52 of the second unit cell 16 is kept at a desired level. Therefore, it is possible to achieve a uniform current density distribution in the first unit cell 14 and the second unit cell 16, and enhance the power generation performance effectively.

Figure 7:
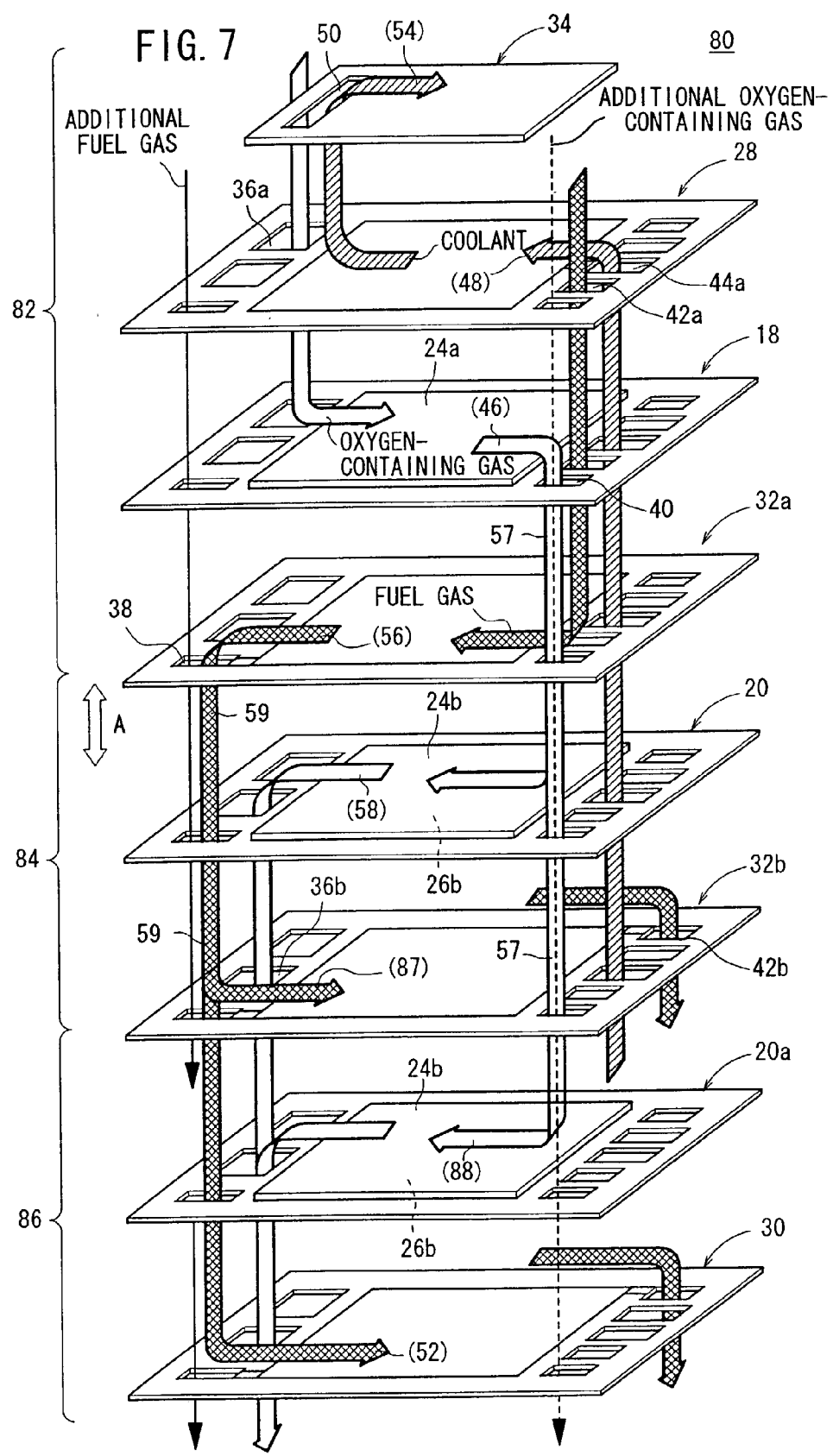
FIG. 7 is an exploded perspective view showing main components of a cell assembly as a part of a fuel cell stack according to a second embodiment of the present invention.
Figure 8:
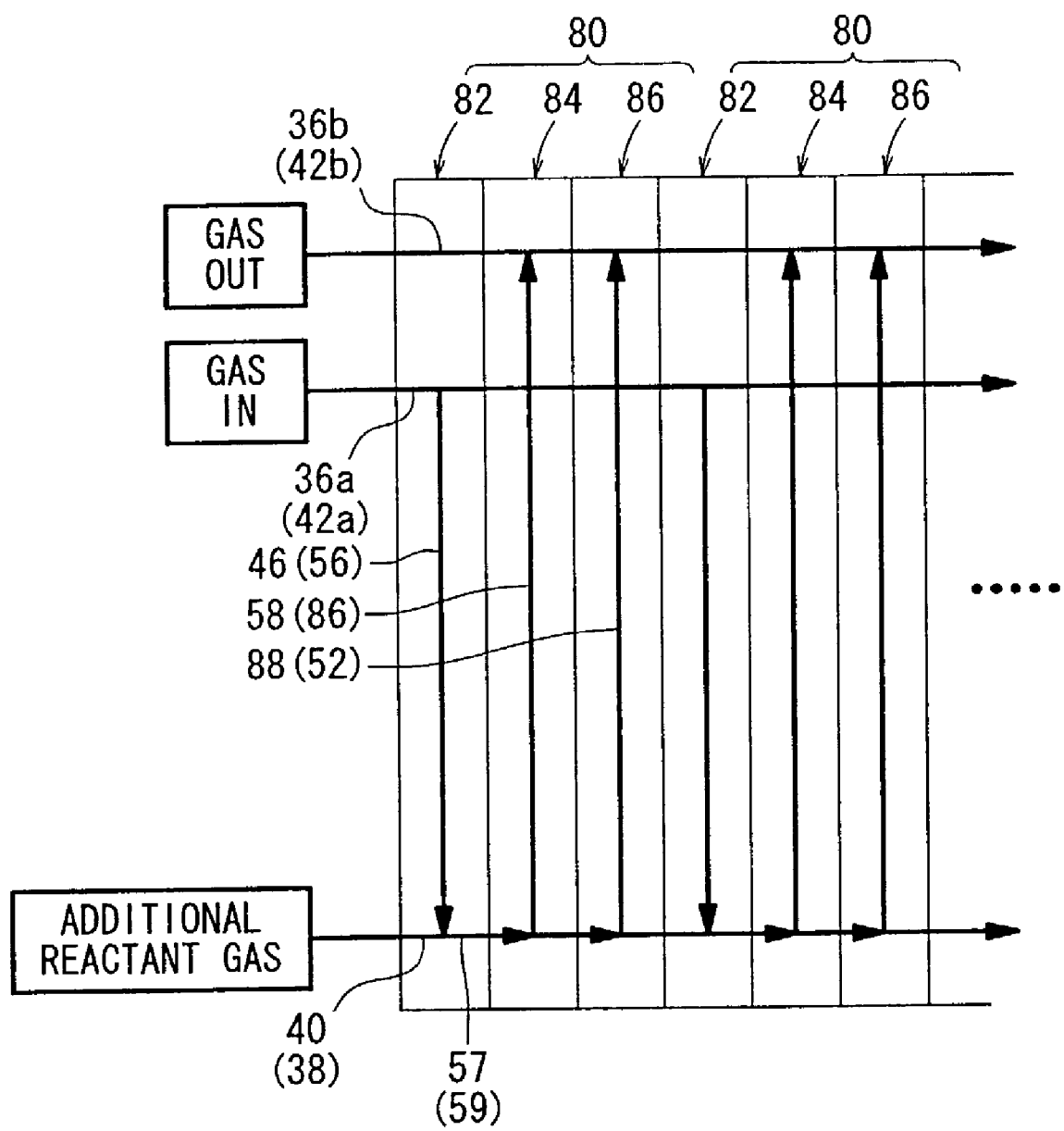
FIG. 8 is a view showing flows of fluid in cell assemblies.

FIG. 7 is an exploded schematic view showing flows of an oxygen-containing gas, a fuel gas, and a coolant flowing in a cell assembly 80 of a fuel cell stack according to a second embodiment of the present invention. FIG. 8 is a view showing the flows of the oxygen-containing gas and the fuel gas. The constituent elements that are identical to those of the cell assembly 10 according to the first embodiment are labeled with the same reference numeral, and description thereof is omitted.

A first unit cell 82, a second unit cell 84, and a third unit cell 86 are stacked together to form the cell assembly 80. The first unit cell 82 includes a first membrane electrode assembly 18, the second unit cell 84 includes a second membrane electrode assembly 20, and the third unit cell 86 includes a third membrane electrode assembly 20a. A first intermediate separator 32a is interposed between the first membrane electrode assembly 18 and the second membrane electrode assembly 20, and a second intermediate separator 32b is interposed between the second membrane electrode assembly 20 and the third membrane electrode assembly 20a.

The second intermediate separator 32b has a fuel gas flow passage (reactant gas flow passage) 87 comprising a plurality of grooves on its surface facing to the anode 26b of the second membrane electrode assembly 20. Further, the second intermediate separator 32b has an oxygen-containing gas flow passage (reactant gas flow passage) 88 comprising a plurality of grooves on its surface facing to the cathode 24b of the third membrane electrode assembly 20a.

In the second embodiment, an oxygen-containing gas having a predetermined humidity is supplied to the cathode 24a of the first unit cell 82. After the chemical reaction in the first unit cell 82, the oxygen-containing gas is supplied to the intermediate oxygen-containing gas flow gas passage 57. Further, an additional oxygen-containing gas having a relatively low humidity is supplied to the oxygen-containing gas passage 40 which includes an intermediate oxygen-containing gas flow passage 57. Thus, the oxygen-containing gas is mixed with the additional oxygen-containing gas in the intermediate oxygen-containing gas flow passage 57.

The additional oxygen-containing gas is humidified by the water (vapor) produced in the chemical reaction at the cathode 24b in the intermediate oxygen-containing gas flow passage 57, and supplied in parallel to an oxygen-containing gas flow passage 58 of the second unit cell 84 and an oxygen-containing gas flow passage 88 of the third unit cell 86.

Thus, the oxygen-containing gas having a humidity kept at a desired level is supplied to each of the first through third unit cells 82, 84, 86, and the pressure drops are small. Therefore, as with the first embodiment, the power generation in the overall cell assembly 80 is efficiently carried out, for example. The water produced in the first unit cell on the upstream is supplied in parallel to a larger number of unit cells, i.e., the second unit cell 84 and the third unit cell 86. Therefore, it is possible to effectively reduce the humidity.

In the first embodiment, the cell assembly 10 is made up of the first and second unit cells 14, 16. In the second embodiment, the cell assembly 80 is made up of the first through third unit cells 82, 84, 86. However, various modifications can be made to the number of unit cells. For example, a cell assembly 90 shown in FIG. 9 is made up of five unit cells, i.e., two unit cells (first unit cells) 14 on the upstream side, and three unit cells (second unit cells) 16 on the downstream side.

FIG. 10 is a view showing flows of fluids in cell assemblies 100 of a fuel cell stack according to a third embodiment of the present invention. The constituent elements that are identical to those of the cell assembly 80 according to the second embodiment are labeled with the same reference numeral, and description thereof is omitted.

A first unit cell 102, a second unit cell 104, and a third unit cell 106 are stacked together to form the cell assembly 100. An oxygen-containing gas passage 40 and an oxygen-containing gas supply passage 108 are provided in parallel in the stacking direction. Further, a fuel gas passage 38 and a fuel gas supply passage 110 are provided in parallel in the stacking direction.

An end plate 112 is connected at an end of the outermost cell assembly 100. The end plate has a return passage 114 for connecting the oxygen-containing gas passage 40 and the oxygen-containing supply passage 108, and a return passage 116 for connecting the fuel gas passage 38 and the fuel gas supply passage 110.

The oxygen-containing gas supply passage 108 is connected to a supply passage 118 between the second unit cell 104 and the third unit cell 106 in each of the cell assemblies 100. The supply passage 118 is connected to the oxygen-containing gas passage 40. The fuel gas supply passage 110 is connected to a fuel gas supply passage 120 between the second unit cell 104 and the third unit cell 106 in each of the cell assemblies 100. The fuel gas supply passage 120 is connected to the fuel gas passage 38.

In the third embodiment, the oxygen-containing gas whose oxygen is partially consumed in each of the first unit cells 102 flows through the return passage 114 in the end plate 112, and flows through the oxygen-containing gas supply passage 108. The oxygen-containing gas is mixed with an additional oxygen-containing gas having a relatively low humidity, and supplied to the supply passage 118 between the second unit cell 104 and the third unit cell 106.

The oxygen-containing gas whose oxygen is partially consumed in the first unit cell 102 and the additional oxygen-containing gas (fresh oxygen-containing gas) are mixed together, and the mixed oxygen-containing gas supplied to the second unit cell 104 and the third unit cell 106. The additional oxygen-containing gas is humidified by the water (vapor) produced in the chemical reaction in the first unit cell 102.

Thus, the oxygen-containing gas having a constant humidity is sufficiently supplied to the first unit cell 102 on the upstream side and the second and third unit cells 104, 106 on the downstream side. As with the first and second embodiments, the amount of water needed for humidifying the oxygen-containing gas supplied to the cell assemblies 100 is small, the pressure drops are small, and the power generation is efficiently carried out.

FIG. 11 is a view showing flows of fluids in cell assemblies 130 of a fuel cell stack according to a fourth embodiment of the present invention. The constituent elements that are identical to those of the cell assembly 100 according to the third embodiment are labeled with the same reference numeral, and description thereof is omitted.

In the cell assembly 130, an oxygen-containing gas passage 40 and an oxygen-containing gas supply passage 132 are provided in parallel, and a fuel gas passage 38 and a fuel gas supply passage 134 are provided in parallel. Therefore, an additional oxygen-containing gas having a relatively low humidity supplied from an external gas source to the oxygen-containing gas supply passage 132 flows into an intermediate oxygen-containing gas flow passage 57 between the second unit cell 104 and the third unit cell 106. Thus, the third unit cell 106 is humidified, and the oxygen-containing gas is supplied to the third unit cell 106. In the fourth embodiment, effects and advantages as described in connection with the third embodiment can be obtained.

In the fuel cell stack and the reactant gas supplying method of the present invention, water produced in the unit cell on the upstream is used to humidify additional reactant gases supplied through the reactant gas passage for supplying the humidified gases to the unit cell on the downstream. Therefore, the amount of water needed for humidifying the reactant gases to the overall fuel cell stack is very small, the pressure drops are small, and the power generation is efficiently carried out.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell stack including a cell assembly of unit cells stacked together, said unit cells each having a membrane electrode assembly including an anode, a cathode, and an electrolyte interposed between said anode and said cathode, said unit cells having reactant gas flow passages therein for supplying a reactant gas along a reactant surface thereof, said reactant gas including at least one of a fuel gas and an oxygen-containing gas, and said unit cells including an upstream unit cell and a downstream unit cell, wherein said reactant gas flow passages are connected in series by communicating an outlet of said reactant gas flow passage of said upstream unit cell and an inlet of said reactant gas flow passage of said downstream unit cell by a communicating reactant gas passage, wherein an additional reactant gas is supplied to said communicating reactant gas passage, wherein a reactant gas supply passage and a return passage extend through said cell assembly, said return passage connecting said communicating reactant gas passage and said reactant gas supply passage, and said reactant gas discharged from said upstream unit cell flows through said return passage and flows into said reactant gas supply passage of said downstream unit cell.

2. A fuel cell stack according claim 1, wherein a reactant gas supply passage, a reactant gas discharge passage, and said communicating reactant gas passage extend through said cell assembly in the stacking direction of said unit cells, said reactant gas is humidified in said upstream unit cell and supplied as a humidified reactant gas to said communicating reactant gas passage, and a humidity of said additional reactant gas supplied to said communicating reactant gas passage is lower than a humidity of said humidified reactant gas supplied to said communicating reactant gas passage.

3. A fuel cell stack according to claim 1, wherein a number of said downstream unit cells is larger than a number of said upstream cells;

said downstream cells are connected in parallel by reactant gas flow passages; and said reactant gas flow passage of said upstream unit cells and said reactant gas flow passage of said downstream unit cells ore connected in series.

4. A fuel cell stack according to claim 1, wherein said electrolyte is an ion exchange membrane of solid polymer electrolyte.

* * * * *

UNITED STATES PATENT AND TRADEMARK OFFICE
CERTIFICATE OF CORRECTION

| | |
|---|---|
| PATENT NO. | : 7,090,941 B2 |
| APPLICATION NO. | : 10/243467 |
| DATED | : August 15, 2006 |
| INVENTOR(S) | : Ichiro Baba et al. |

It is certified that error appears in the above-identified patent and that said Letters Patent is hereby corrected as shown below:

Title page item [30] Foreign Application Priority Data

"2001-280317" should be replaced with --2001-280314--

Signed and Sealed this

Twenty-fourth Day of April, 2007

JON W. DUDAS
*Director of the United States Patent and Trademark Office*